United States Patent
Jung et al.

(10) Patent No.: US 8,305,534 B2
(45) Date of Patent: Nov. 6, 2012

(54) LIQUID CRYSTAL DISPLAY AND PANEL THEREOF

(75) Inventors: Mee-Hye Jung, Suwon-si (KR); Bong-Sung Seo, Yongin-si (KR); Young-Gu Kim, Suwon-si (KR); Ki-Won Kim, Suwon-si (KR); Min-Sik Jung, Seoul (KR); Byoung-Hun Sung, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 13/401,586

(22) Filed: Feb. 21, 2012

(65) Prior Publication Data

US 2012/0147308 A1 Jun. 14, 2012

Related U.S. Application Data

(63) Continuation of application No. 12/389,754, filed on Feb. 20, 2009, now Pat. No. 8,134,670.

(30) Foreign Application Priority Data

Jul. 24, 2008 (KR) .................. 10-2008-0072385

(51) Int. Cl.
*G02F 1/1337* (2006.01)
(52) U.S. Cl. ........................... 349/129; 349/123
(58) Field of Classification Search ............ None
See application file for complete search history.

(56) References Cited

U.S. PATENT DOCUMENTS

| 7,468,772 | B2 | 12/2008 | Yoshida et al. |
| 7,969,523 | B2 | 6/2011 | Chen |
| 2005/0280749 | A1 | 12/2005 | Jung et al. |
| 2006/0197894 | A1 | 9/2006 | Higa et al. |
| 2007/0019144 | A1 | 1/2007 | Nakanishi et al. |
| 2007/0229744 | A1 | 10/2007 | Yamaguchi et al. |
| 2008/0002089 | A1* | 1/2008 | Lee et al. ................ 349/48 |
| 2008/0062370 | A1 | 3/2008 | Park |
| 2008/0225218 | A1* | 9/2008 | Lee et al. .............. 349/144 |
| 2008/0291347 | A1* | 11/2008 | Kim et al. .............. 349/33 |

FOREIGN PATENT DOCUMENTS

| EP | 1605511 | 12/2005 |
| EP | 1762884 | 3/2007 |
| JP | 2002082348 | 3/2002 |

(Continued)

OTHER PUBLICATIONS

Non-Final Office Action issued Oct. 29, 2010 in U.S. Appl. No. 12/389,754.
Final Office Action issued Jan. 21, 2011 in U.S. Appl. No. 12/389,754.
Notice of Allowance issued on Nov. 7, 2011 in U.S. Appl. No. 12/389,754.

*Primary Examiner* — Tina Wong
(74) *Attorney, Agent, or Firm* — H.C. Park & Associates, PLC

(57) ABSTRACT

A liquid crystal panel according to an exemplary embodiment of the present invention includes a substrate, and a pixel electrode arranged on the substrate. The pixel electrode includes a first subpixel electrode and a second subpixel electrode separated from each other, and the second subpixel electrode includes a first electrode part disposed above the first subpixel electrode and a second electrode part disposed below the first subpixel electrode and connected to the first electrode part. At least one first notch is arranged on at least one edge of the first subpixel electrode or the second subpixel electrode.

24 Claims, 11 Drawing Sheets

| | FOREIGN PATENT DOCUMENTS | | WO | 2006/132369 | 12/2006 |
|----|----------------|---------|----|-------------|---------|
| JP | 2006184876 | 7/2006 | | | |
| KR | 1020060116580 | 11/2006 | * cited by examiner | | |

# LIQUID CRYSTAL DISPLAY AND PANEL THEREOF

CROSS REFERENCE TO RELATED APPLICATIONS

The present application is a continuation of U.S. patent application Ser. No. 12/389,754, filed on Feb. 20, 2009, and claims priority from and the benefit of Korean Patent Application No. 10-2008-0072385, filed on Jul. 24, 2008, which are both hereby incorporated by reference for all purposes as if fully set forth herein.

BACKGROUND OF THE INVENTION

1. Field of the Invention

The present invention relates to a liquid crystal display and a display panel thereof.

2. Discussion of the Background

A liquid crystal display (LCD) is one of the most widely used flat panel displays, and includes a pair of panels provided with field-generating electrodes, such as pixel electrodes and a common electrode, and a liquid crystal (LC) layer interposed between the two panels. The LCD displays images by applying voltages to the field-generating electrodes, which generate an electric field in the LC layer that determines the orientations of LC molecules therein to adjust polarization of incident light.

Among LCDs, a vertical alignment (VA) mode LCD, which aligns LC molecules such that the long axes of the LC molecules are perpendicular to the panels in the absence of an electric field, is of interest because of its high contrast ratio and wide reference viewing angle.

In the VA mode LCD, a wide viewing angle may be obtained by forming a plurality of domains having different alignment directions of the liquid crystal in one pixel.

The plurality of domains in one pixel can be realized by forming cutouts in the field-generating electrodes. In this method, a plurality of domains may be formed by aligning the LC molecules vertically with respect to the fringe field generated between the edges of the cutout and the field generating electrodes facing the edges.

However, the aperture ratio is decreased in this structure. Also, while the LC molecules disposed near the cutouts are easily aligned vertically with respect to the fringe field, the LC molecules disposed in the central portions of the domains far from the cutouts are affected by a random motion such that the response speed becomes slow and a domain of the opposite direction is formed such that an instant afterimage may appear.

As another means for forming the plurality of domains in one pixel, there is a light alignment method in which the alignment direction of the LC molecules and the alignment angle are controlled by irradiating light on the alignment layer. In the light alignment method, it is not necessary to form cutouts in the field generating electrode, so the aperture ratio may be is increased and the response time of the LC molecules may be improved by a pretilt angle generated under the light alignment.

On the other hand, a VA mode LCD may have lower side visibility than front visibility, so one pixel is divided into two subpixels and different voltages are applied to the subpixels to solve this problem.

However, when the light alignment method is applied to the structure having two divided subpixels, the alignment direction determined by the light alignment may be different from the alignment direction of the LC molecules determined by the fringe field generated at a gap between the two subpixels of the LCD such that texture may be generated. The texture decreases transmittance and may appear as a stain such that the display characteristics of the LCD may be deteriorated.

SUMMARY OF THE INVENTION

The present invention provides a liquid crystal display and a display panel thereof.

Additional features of the invention will be set forth in the description which follows, and in part will be apparent from the description, or may be learned by practice of the invention.

The present invention discloses a liquid crystal panel that includes a substrate and a pixel electrode disposed on the substrate. The pixel electrode includes a first subpixel electrode and a second subpixel electrode, wherein the second subpixel electrode includes a first electrode part disposed above the first subpixel electrode, and a second electrode part disposed below the first subpixel electrode and connected to the first subpixel electrode. At least one is first notch is arranged on at least one edge of the first subpixel electrode or the second subpixel electrode.

The present invention also discloses a liquid crystal display that includes a first substrate, a pixel electrode disposed on the first substrate. The pixel electrode includes a first subpixel electrode and a second subpixel electrode separated from each other, a second substrate facing the first substrate, a common electrode arranged on the second substrate, and a liquid crystal layer interposed between the pixel electrode and the common electrode, wherein the second subpixel electrode includes a first electrode part disposed on the first subpixel electrode, a second electrode part disposed under the first subpixel electrode and connected to the first subpixel electrode, and a plurality of connection pieces connecting the first electrode part and the second electrode part on right and left sides of the first subpixel electrode, and wherein first notches are arranged near a center of an upper edge and a lower edge of the first subpixel electrode, and near a center of a left edge and a right edge of the second subpixel electrode.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

Figure 1:
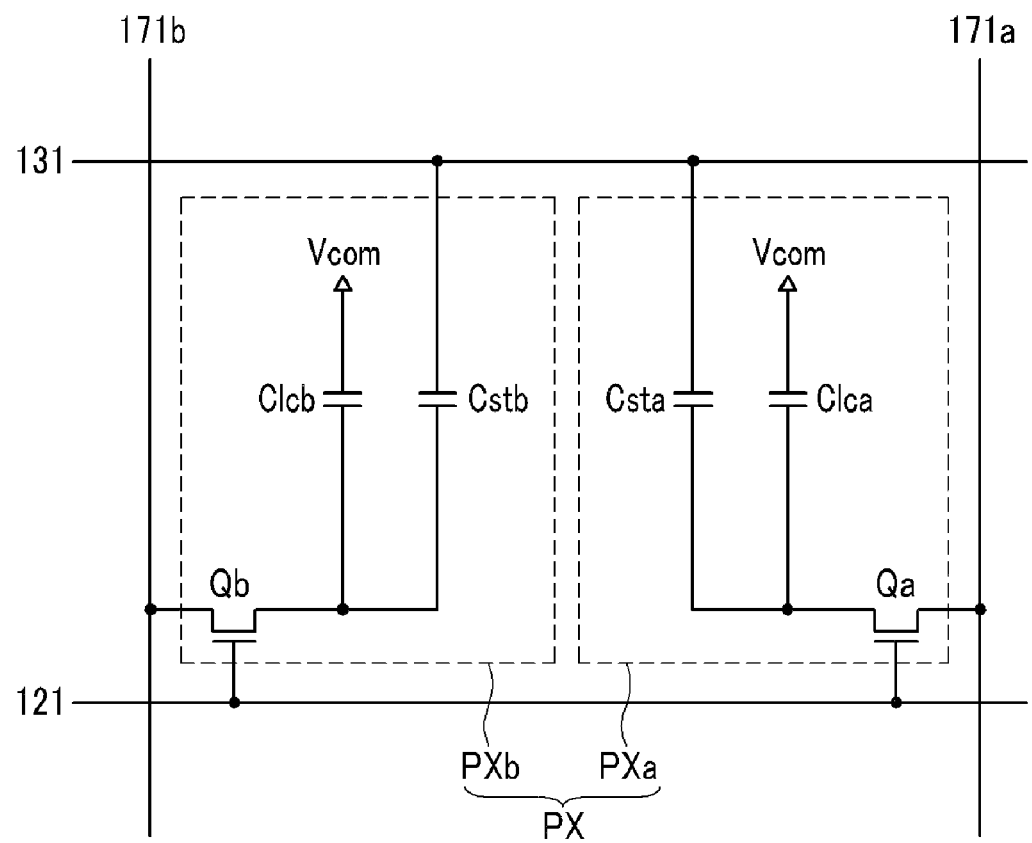
FIG. 1 is an equivalent circuit diagram of one pixel of the liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or is "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

First, a liquid crystal display according to an exemplary embodiment of the present invention will be described with reference to FIG. 1, FIG. 2, and FIG. 3.

Figure 2:
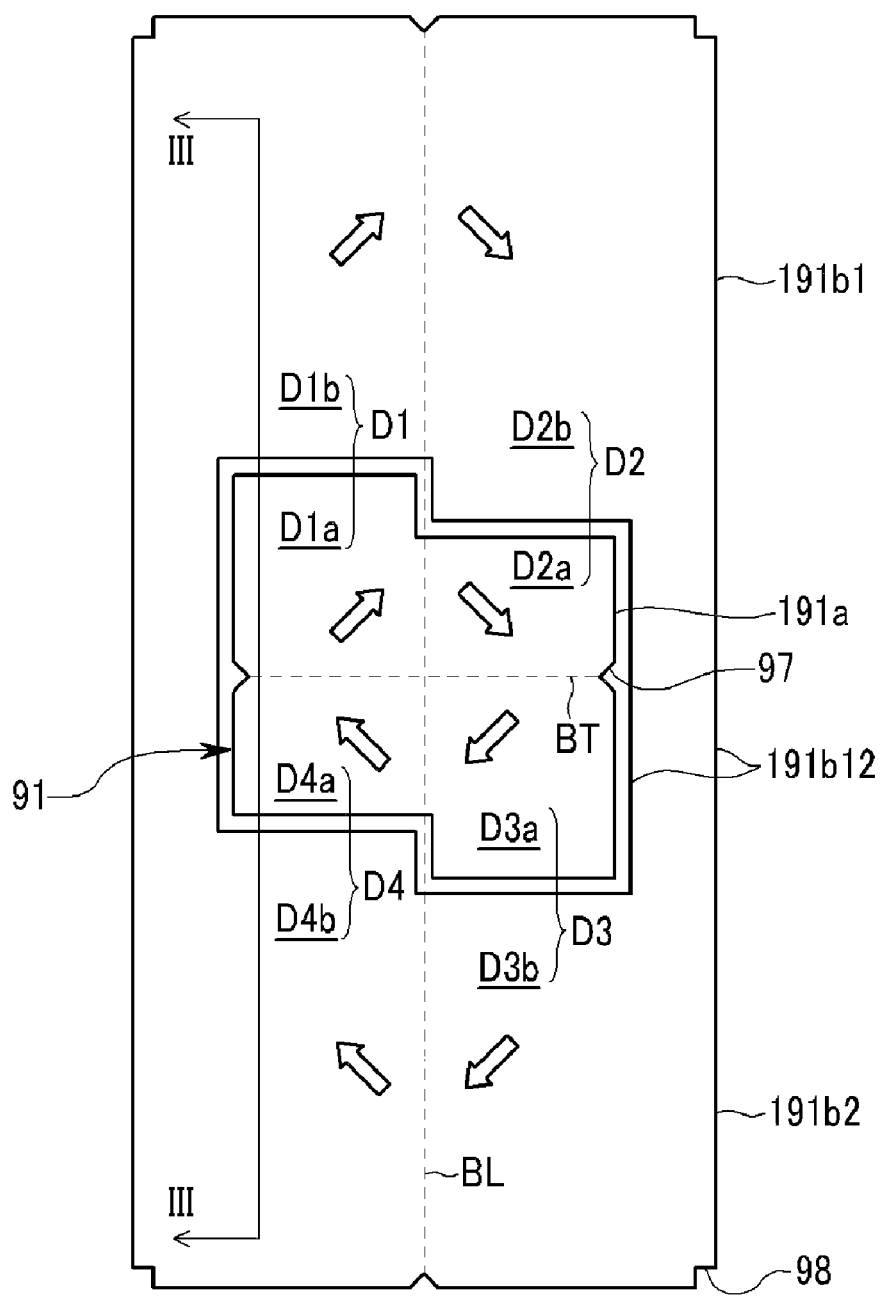
FIG. 2 is a layout view of a pixel electrode in a liquid crystal display according to an exemplary embodiment of the present invention.
Figure 3:
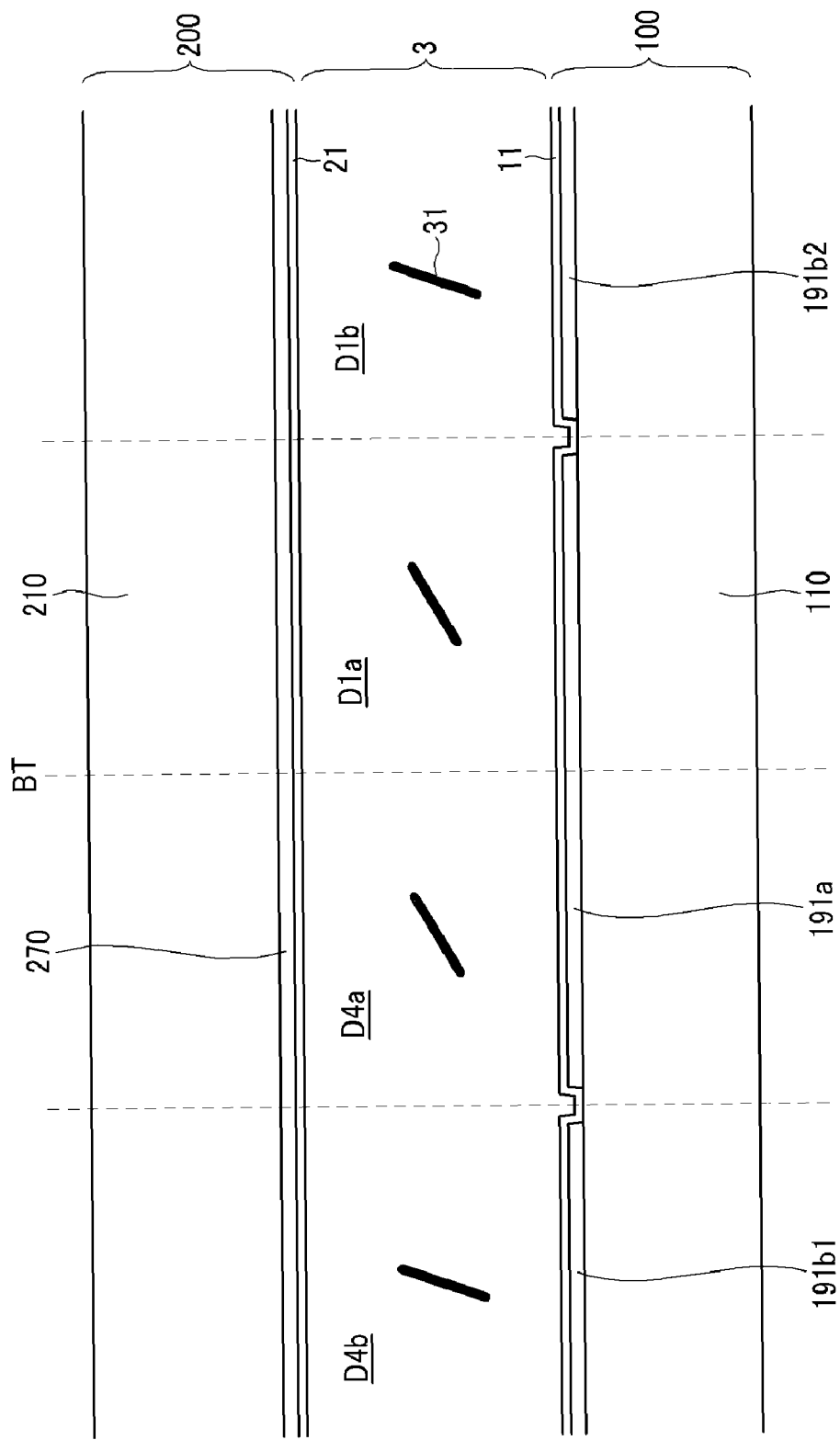
FIG. 3 is a cross-sectional view of the liquid crystal display including the pixel is electrode shown in FIG. 2, taken along line III-III of FIG. 2.

FIG. 1 is an equivalent circuit diagram of one pixel of the liquid crystal display according to an exemplary embodiment of the present invention, FIG. 2 is a layout view of a pixel electrode in a liquid crystal display according to an exemplary embodiment of the present invention, FIG. 3 is a cross-sectional view of the liquid crystal display including the pixel electrode shown in FIG. 2 and taken along line III-III of FIG. 2, and FIG. 4, FIG. 5, and FIG. 6 are layout views of a pixel electrode according to another exemplary embodiment of the present invention.

Referring to FIG. 1, a liquid crystal display according to an exemplary embodiment of the present invention includes a plurality of signal lines 121, 131, 171a, and 171b, and pixels PX connected thereto. Referring to FIG. 2 and FIG. 3, the liquid crystal display according to the present exemplary embodiment includes a lower panel 100 and an upper panel 200 facing each other, and a liquid crystal layer 3 interposed therebetween. Pixel electrodes 191 are formed on the lower panel 100, a common electrode 270 is formed on the upper panel 200, and alignment layers 11 and 21 are respectively formed on the pixel electrodes 191 and the common electrode 270. A pixel electrode 191 includes first and second subpixel electrodes 191a and 191b that are separated from each other.

The signal lines 121, 131, 171a, and 171b are provided on the lower panel 100, and include a gate line 121 to transmit a gate signal, a pair of data lines 171a and 171b to transmit data voltages, and a storage electrode line 131, which receives a storage voltage.

Each pixel PX includes a pair of subpixels PXa and PXb (see FIG. 1), and the subpixels PXa and PXb respectively include a switching element Qa and Qb, a liquid crystal capacitor Clca and Clcb, and a storage capacitor Csta and Cstb.

Each switching element Qa and Qb is a three terminal element including a control terminal, an input terminal, and an output terminal, wherein the control terminal is connected to the gate line 121, the input terminal is connected to the corresponding data line 171a and 171b, and the output terminal is connected to the corresponding liquid crystal capacitor Clca and Clcb and storage capacitor Csta and Cstb.

The liquid crystal capacitors Clca and Clcb respectively include the subpixel electrodes 191a and 191b of the lower panel 100 and the common electrode 270 of the upper panel 200 as its two terminals. The liquid crystal layer 3, which is disposed between the subpixel electrodes 191a and 191b and common electrode 270, functions as a dielectric material. The subpixel electrodes 191a and 191b are connected to the switching elements Qa and Qb, respectively, and the common electrode 270 is formed on the whole surface of the upper panel 200 and receives a common voltage Vcom.

The storage capacitors Csta and Cstb, which serve as auxiliaries to the liquid crystal capacitors Clca and Clcb, respectively, are formed where the storage electrode line 131 and the pixel electrodes 191a and 191b overlap each other via an insulator interposed therebetween. The storage capacitors Csta and Cstb may be omitted if necessary.

Referring to FIG. 2, the pixel electrode 191 has a rectangular shape that extends in a longitudinal direction, and the first subpixel electrode 191a is enclosed by the second subpixel is electrode 191b.

The first subpixel electrode 191a has a shape of two identical rectangles, which extend in the longitudinal direction and are longitudinally offset from and connected to each other. Thus, if the two rectangles are symmetrically aligned and combined, an approximate square may be formed. However, the ratio of the longitudinal length to a transverse length of the first subpixel electrode 191a may be changed.

The second subpixel electrode 191b encloses the first subpixel electrode 191a with a gap 91 having a uniform width therebetween, except that the width is not uniform in an area that notches 97 are disposed. The second subpixel electrode 191b includes an upper electrode part 191b1 disposed above the first subpixel electrode 191a, a lower electrode part 191b2 disposed therebelow, and connection pieces 191b12 connecting the two electrode parts 191b1 and 191b2 on the right and left sides of the first subpixel electrode 191a.

The second subpixel electrode 191b is larger than the first subpixel electrode 191a, and a desired ratio of areas thereof may be embodied by controlling the ratio of the longitudinal length of the first subpixel electrode 191a to that of the second subpixel electrode 191b. For example, when the area of the second subpixel electrode 191b may be about two times the area of the first subpixel electrode 191a, the first subpixel electrode 191a, the upper electrode part 191b1, and the lower electrode part 191b2 all may have the same area.

Figure 4:
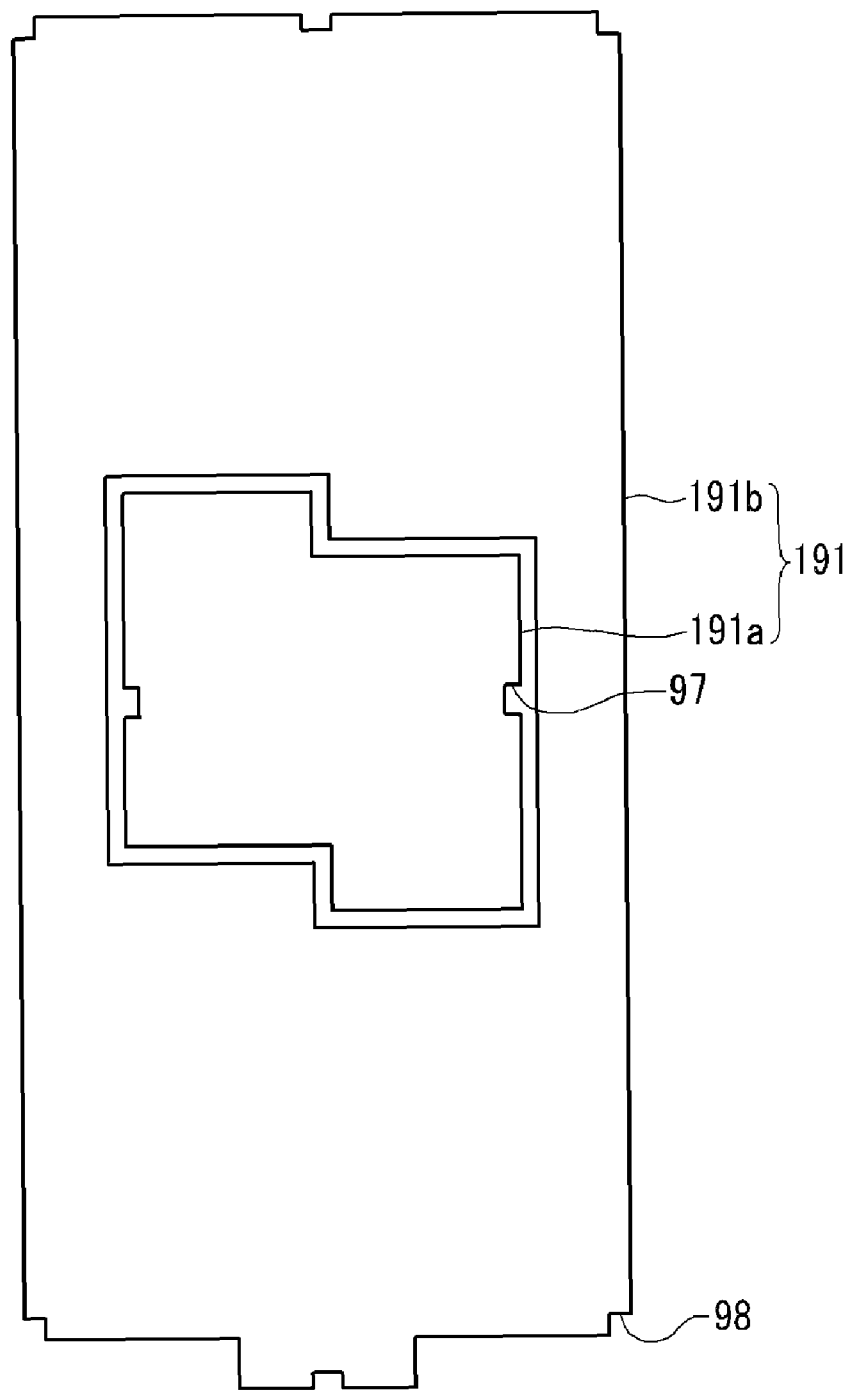
FIG. 4, FIG. 5, and FIG. 6 are layout views of a pixel electrode according to another exemplary embodiment of the present invention.
Figure 5:
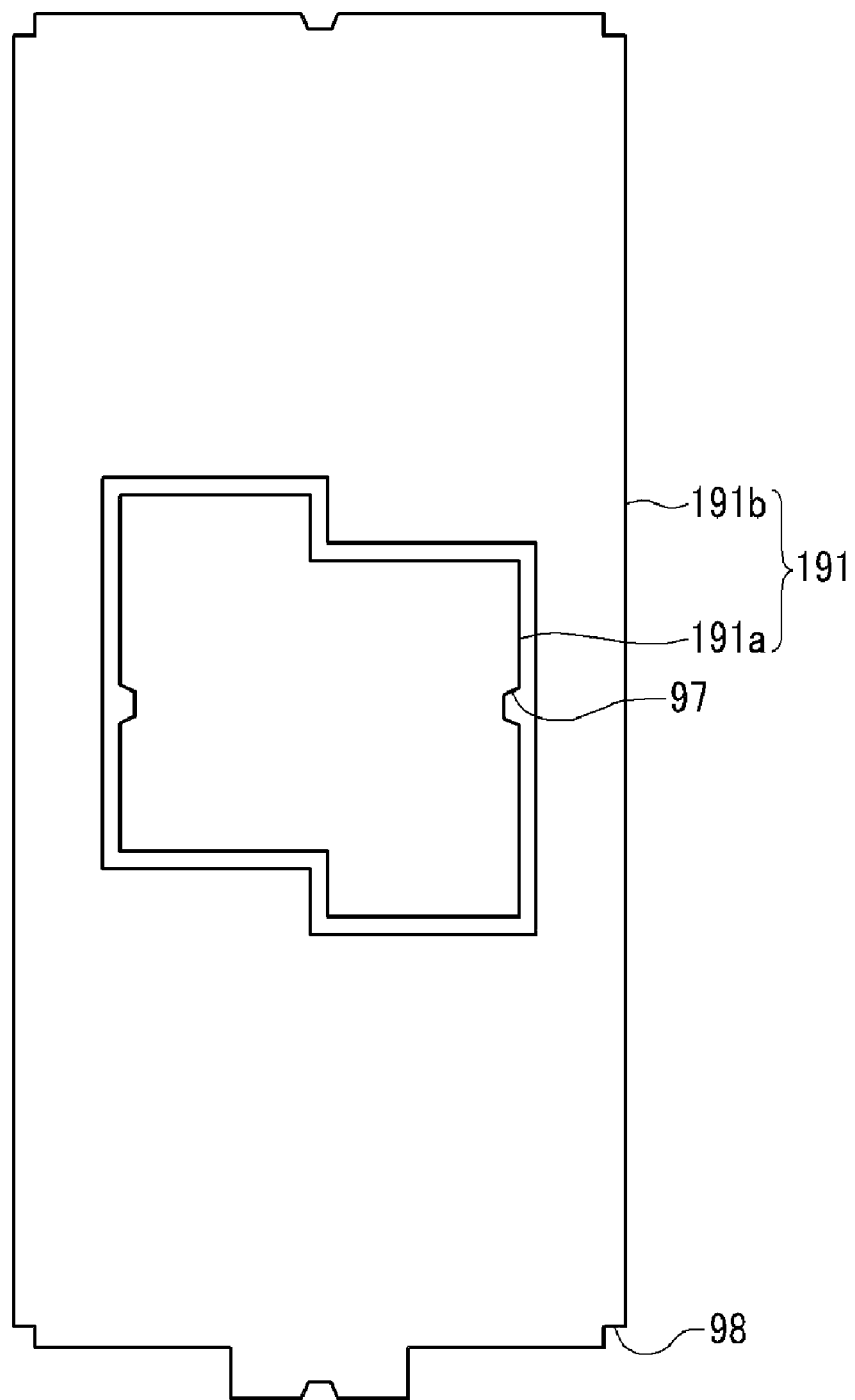
Figure 6:
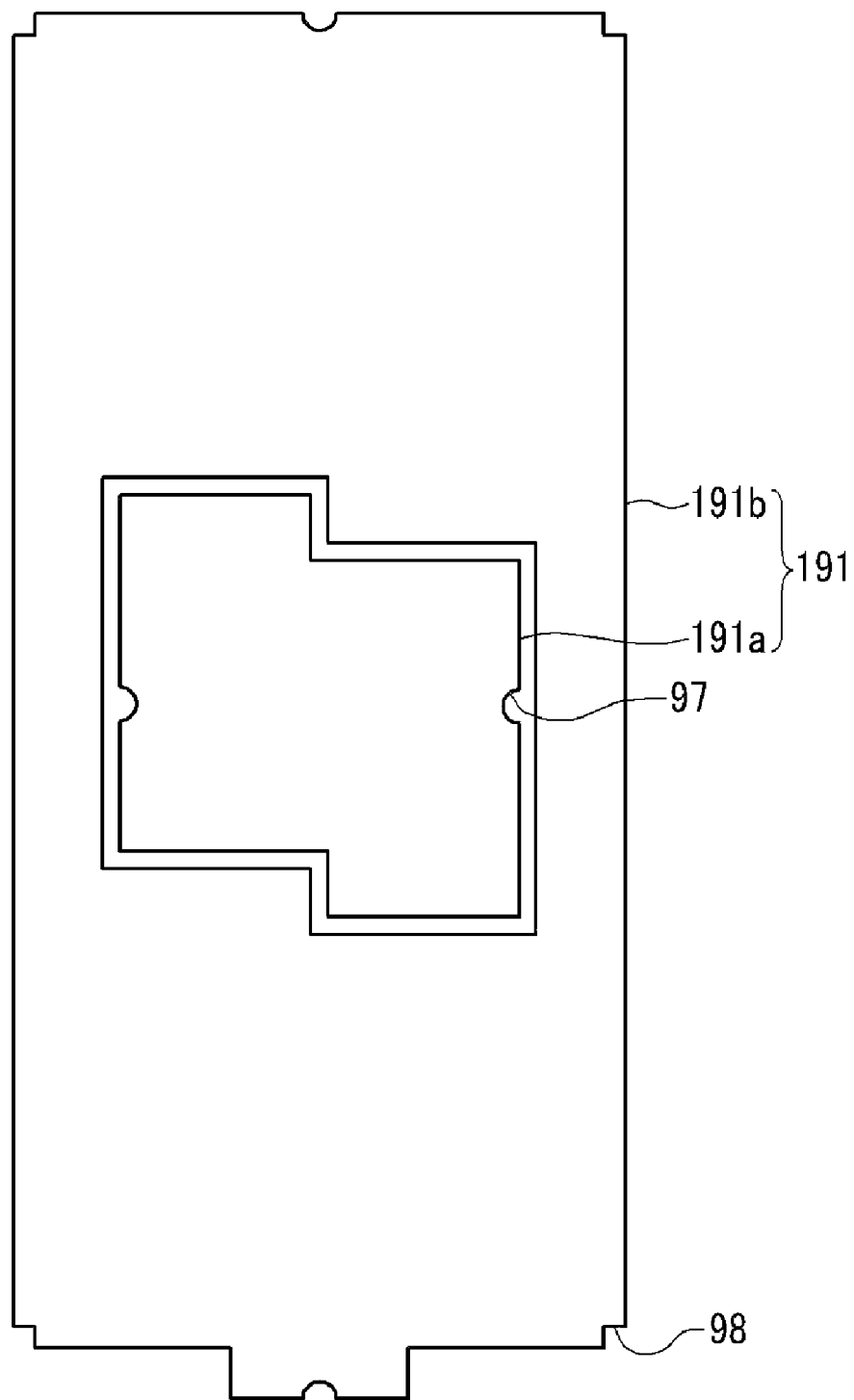

A plurality of notches 97 are formed near the center of the left edge and the right edge of the first subpixel electrode 191a, and near the center of the upper edge and the lower edge of the second subpixel electrode 191b. The notches 97 shown in FIG. 2 have a shape of a triangle, however they may have a shape of a quadrangle, a trapezoid, or a semicircle, as shown in FIG. 4, FIG. 5, and FIG. 6. Further, it is possible for the notches 97 to have various shapes is such as a curved line, a slit and a protrusion shape protruding outside. The number and the size of the notches 97 may be changed.

Notches 98 are formed at the corners of the pixel electrode 191 and may have a quadrangular shape.

The liquid crystal layer 3 has negative dielectric anisotropy and is aligned in the longitudinal direction with respect to the panels 100 and 200. Polarizers (not shown) are provided on outer surfaces of the substrates 110 and 210, and polarization axes of the two polarizers may cross each other and form an angle of about 45 degrees with respect to the longitudinal and transverse directions.

In the absence of an electric field applied to the liquid crystal layer 3, that is, when a difference between voltages of the pixel electrode 191 and the common electrode 270 equals zero, liquid crystal molecules 31 of the liquid crystal layer 3 may be perpendicular to or slightly inclined from a perpendicular state with respect to the surface of the alignment layers 11 and 21.

If a potential difference is generated between the pixel electrode 191 and the common electrode 270, an electric field that is substantially perpendicular to the surface of the display panels 100 and 200 is generated in the liquid crystal layer 3. Then, the liquid crystal molecules 31 of the liquid crystal layer 3 are aligned such that the long axes thereof are inclined vertically to the direction of the electric field in response to the electric field, and the polarization of light that is incident to the liquid crystal layer 3 is changed according to the inclination degree of the liquid crystal molecules 31. The change of the polarization appears as a change of light transmittance by the polarizers, and thereby images are displayed by the liquid crystal display.

The inclination directions of the liquid crystal molecules 31 are dependent on the is characteristics of the alignment layers 11 and 21. For example, the alignment layers 11 and 21 may be irradiated by ultraviolet rays having different polarization directions or may be obliquely irradiated so as to determine the inclination directions of the liquid crystal molecules 31.

A portion of the liquid crystal layer 3 disposed over the pixel electrode 191 is divided into four regions: left-upper D1, right-upper D2, right-lower D3, and left-lower D4, according to the inclination directions of the liquid crystal molecules 31. The boundaries of these regions D1 through D4 are the transverse central line BT and the longitudinal central line BL bisecting the pixel electrode 191, and the areas of the regions D1 through D4 are almost the same. The inclination directions of the liquid crystal molecules 31 disposed in neighboring regions D1 through D4 in the transverse and longitudinal directions form an angle of about 90 degrees with each other, and the inclination directions of the liquid crystal molecules 31 disposed in neighboring regions in the diagonal direction are opposite to each other.

The arrows in FIG. 2 indicate the inclination directions of the liquid crystal molecules 31. The liquid crystal molecules 31 are inclined in the right-upper direction in the left-upper region D1, in the right-lower direction in the right-upper region D2, in the left-lower direction in the right-lower region D3, in the left-upper direction in the left-lower region D4.

However, the inclination directions in the four regions D1, D2, D3, and D4 are not limited thereto and may be variously changed. Further, there may be greater than or fewer than four inclination directions of the liquid crystal molecules 31, if necessary.

Here, the notch 97 is disposed near the central lines BT and BL, and it may be disposed within 10 μm from the central lines BT and BL. If the notch 97 is disposed outside of this range, sizes of the regions D1, D2, D3, and D4 differ from each other such that an imbalance of the viewing angle may be generated. The notch 97 accelerates the determination of the is inclination direction of the liquid crystal molecules 31. In other words, if the notch 97 does not exist, boundaries of the four regions D1, D2, D3, and D4 in which the liquid crystal molecules are inclined may not be clear, or the boundary determination may become retarded when an electric field is applied. However, if the notch 97 exists, it functions as a singular point such that the inclination direction of the liquid crystal molecules 31 may be quickly changed with the boundaries of the notch 97. The notch 98 disposed at the corners of the pixel electrode 191 may help to quickly determine the inclination directions of the liquid crystal molecules 31 such that the arrangements of liquid crystal molecules 31 may be quickly stabilized. The size of the notches 97 and 98 may be in the range of about 3 μm by 3 μm to 15 μm by 15 μm. However, when the size is greater than or less than these values, the notches 97 and 98 may not function as a singular point.

The viewing angle of the liquid crystal display is widened by varying the inclined directions of the liquid crystal molecules.

On the other hand, if different voltages are applied to the first subpixel electrode 191a and the second subpixel electrode 191b, the magnitude of the relative voltage of the first subpixel electrode 191a is larger than the magnitude of the relative voltage of the second subpixel electrode 191b with respect to the common voltage Vcom. The inclination angles of the liquid crystal molecules 31 may be changed according the intensity of the electric field, and thus, the inclination angles of the liquid crystal molecules 31 that are disposed on the first subpixel electrode 191a and the second subpixel electrode 191b may be different since the voltages of the two subpixel electrodes 191a and 191b are different from each other.

Therefore, each of the regions D1, D2, D3, and D4 of the liquid crystal layer 3 are further divided into first subregions D1a, D2a, D3a, and D4a disposed on the first subpixel is electrode 191a, and second subregions D1b, D2b, D3b, and D4b disposed on the second subpixel electrode 191b. As shown in FIG. 3, since the relative voltage of the first subpixel electrode 191a is higher that that of the second subpixel electrode 191b, the liquid crystal molecules 31 in the first subregions D1a, D2a, D3a, and D4a are more inclined than the liquid crystal molecules 31 of the second subregions D1b, D2b, D3b, and D4b.

Therefore, the luminances of the two subpixels PXa and PXb differ from each other, and the sum of the luminances thereof is equal to the luminance of the pixel PX. Accordingly, the voltages applied to the two subpixel electrodes 191a and 191b are determined to be a value corresponding to the desired luminance of the pixel PX. That is, the voltages applied to the two subpixel electrodes 191a and 191b are provided from an image signal for one pixel PX.

Further, if the voltages of the first subpixel electrode 191a and the second subpixel electrode 191b are appropriately controlled, the images shown at the side may be approximate to the image shown at the front, thereby improving the side visibility and increasing the transmittance of the liquid crystal display.

Next, a liquid crystal display according to another exemplary embodiment of the present invention will be described with reference to FIG. 7, FIG. 8, FIG. 9, FIG. 10, and FIG. 11.

Figure 7:
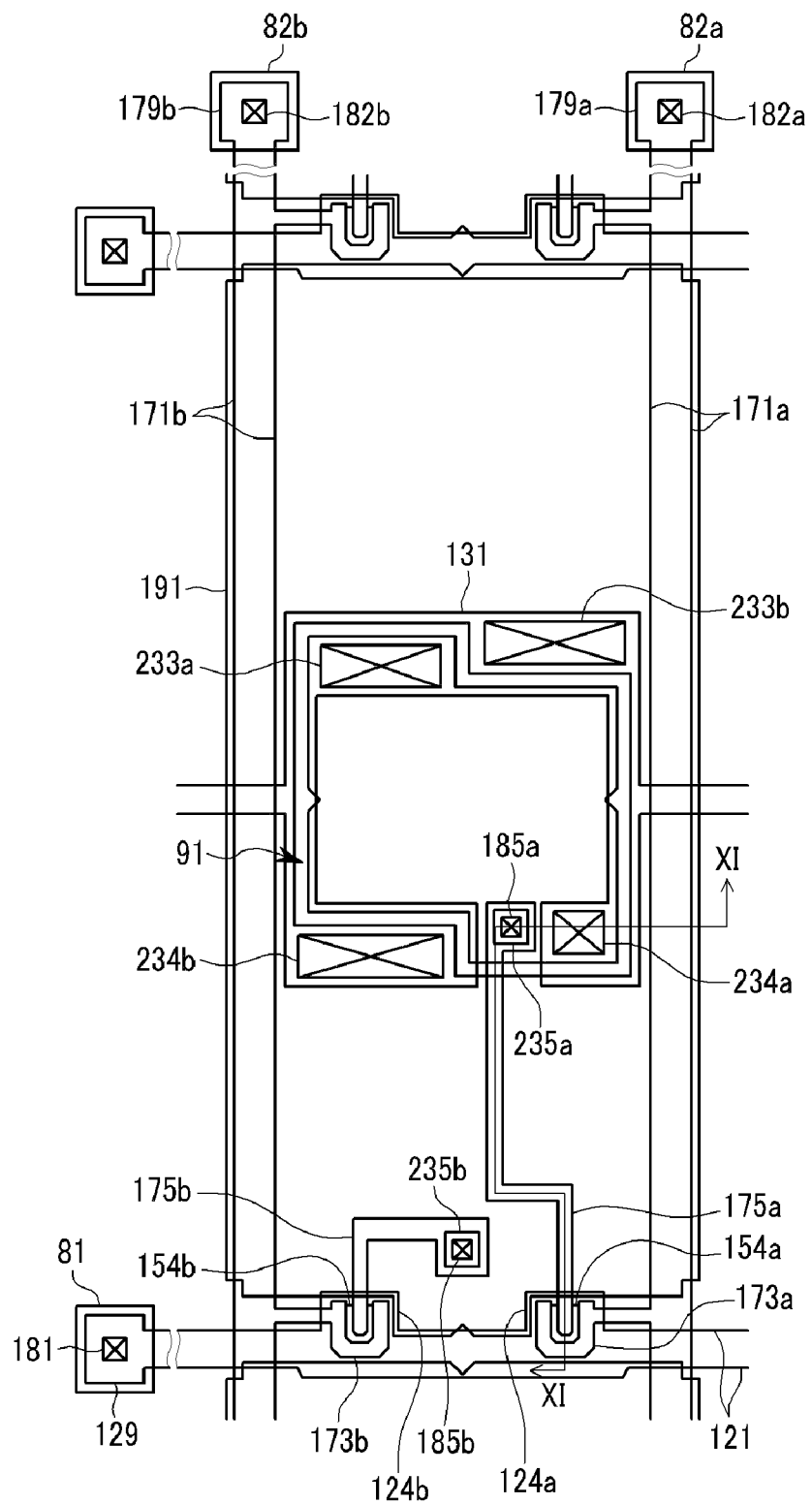
FIG. 7 is a layout view of a liquid crystal display according to an exemplary embodiment of the present invention.
Figure 8:
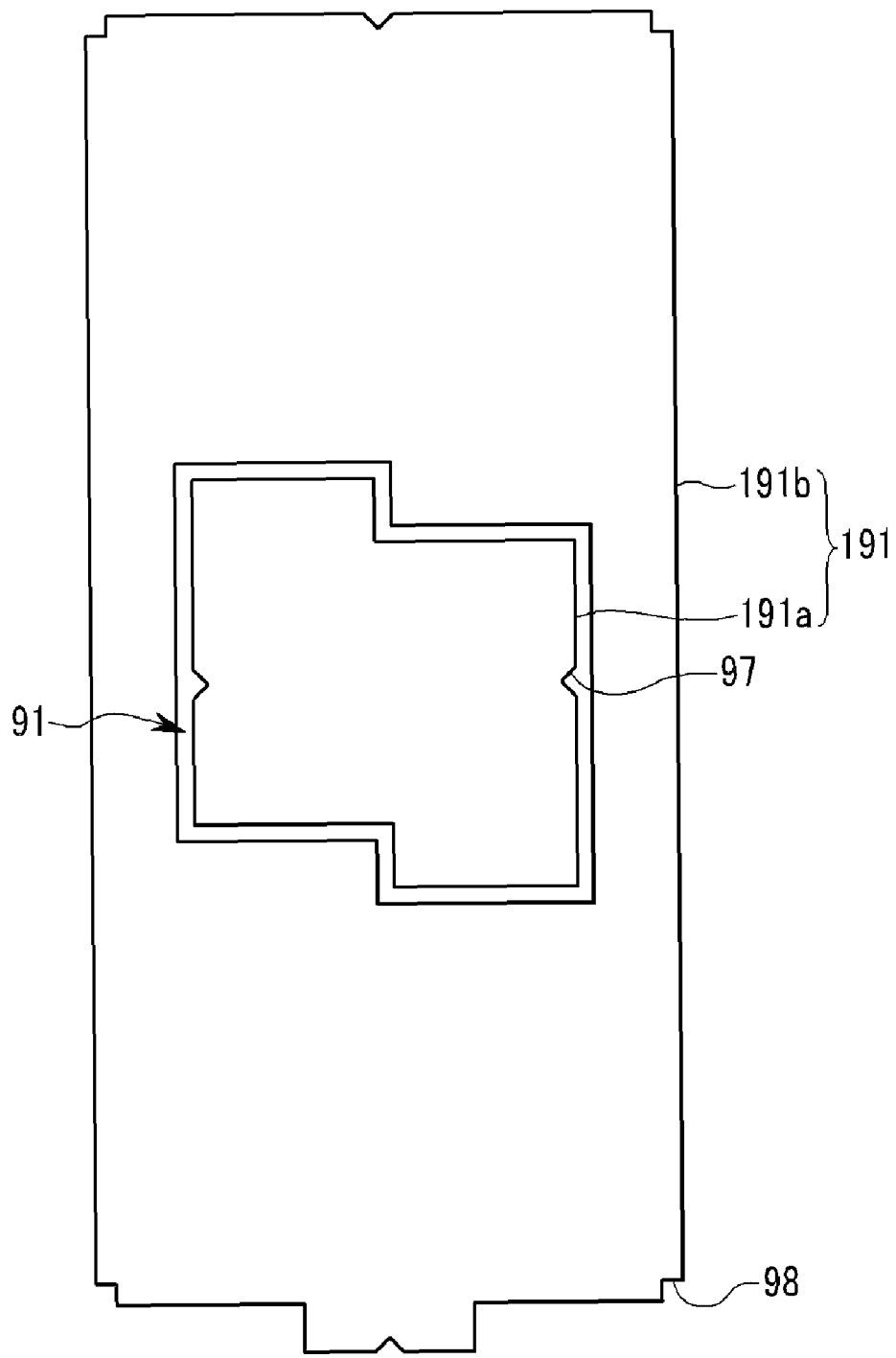
FIG. 8 is a layout view of a pixel electrode of the liquid crystal display shown in FIG. 7.
Figure 9:
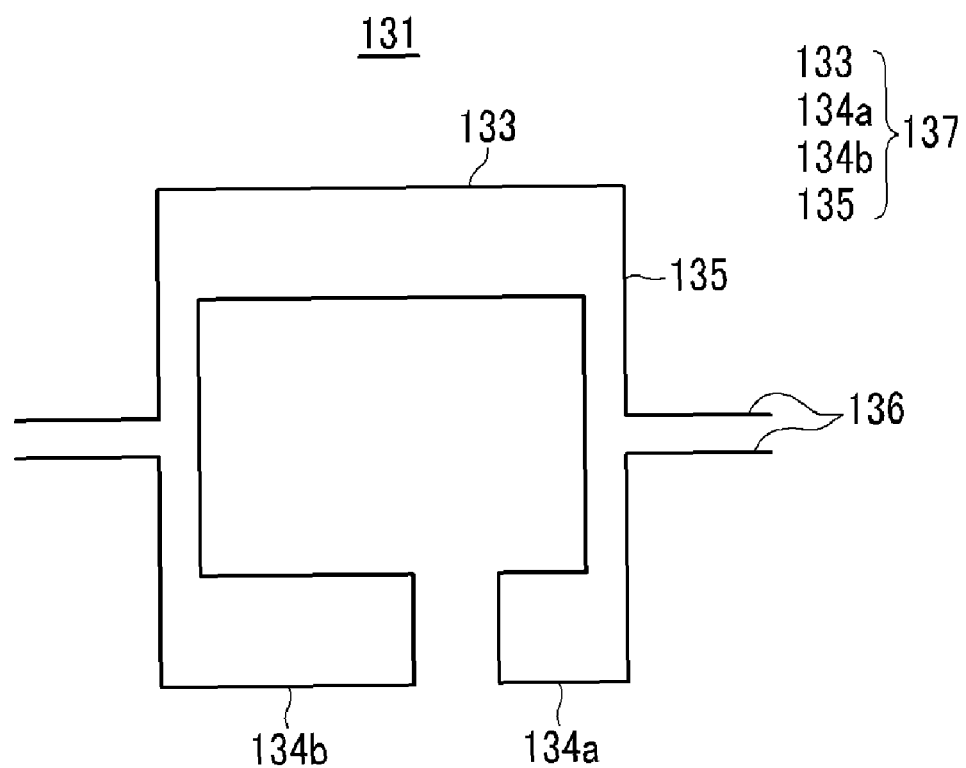
FIG. 9 is a layout view of a storage electrode line of the liquid crystal display shown in FIG. 7.
Figure 10:
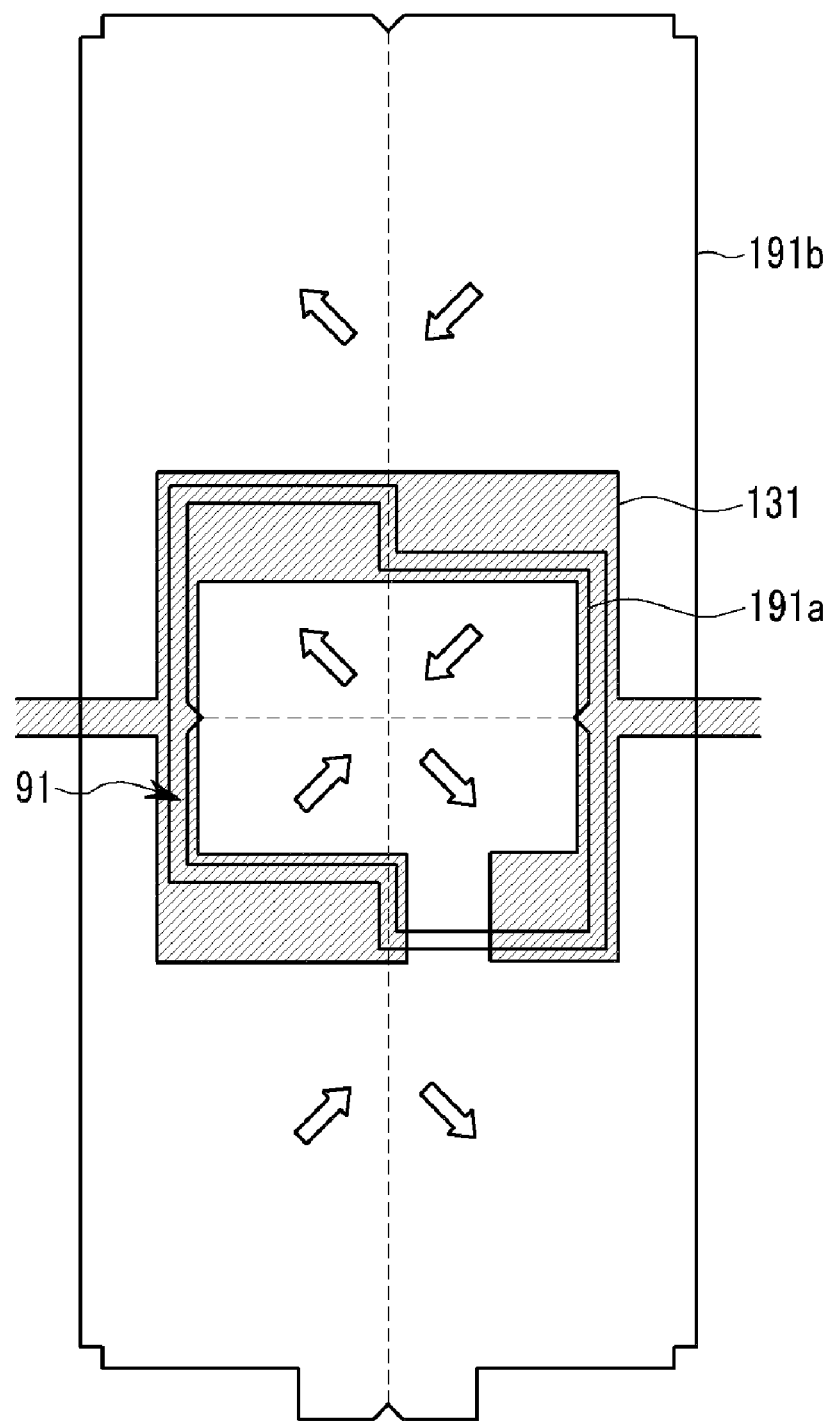
FIG. 10 is a layout view showing an alignment direction of liquid crystal molecules over the pixel electrode in the liquid crystal display of FIG. 7.
Figure 11:
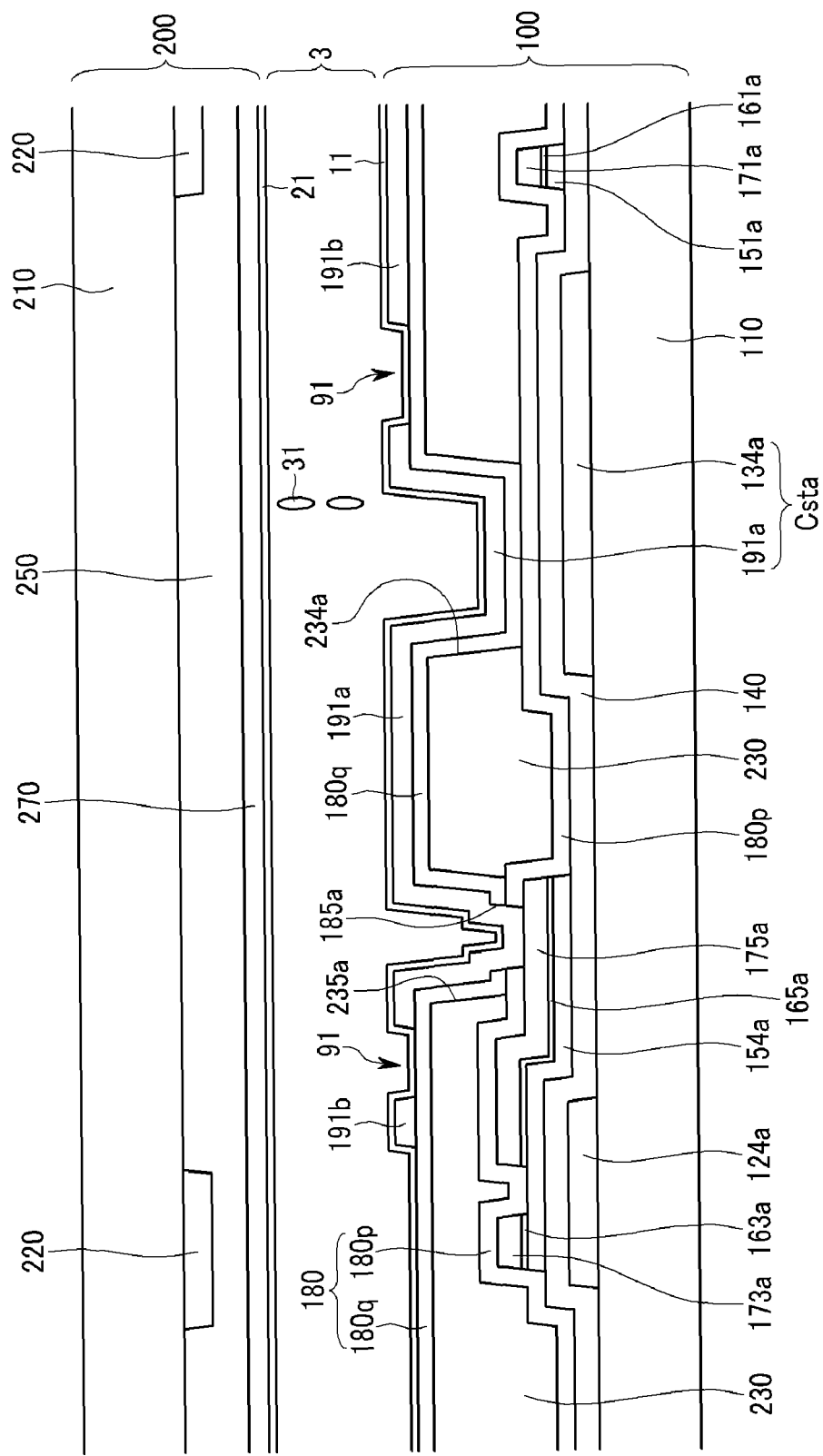
FIG. 11 is a cross-sectional view of the liquid crystal display shown in FIG. 7 taken along line XI-XI of FIG. 7.

FIG. 7 is a layout view of a liquid crystal display according to an exemplary embodiment of the present invention, FIG. 8 is a layout view of a pixel electrode of the liquid crystal display shown in FIG. 7, FIG. 9 is a layout view of a storage electrode line of the liquid crystal display shown in FIG. 7, FIG. 10 is a layout view showing an alignment direction of liquid crystal molecules over the pixel electrode in the liquid crystal display of FIG. 7, and FIG. 11 is a cross-sectional view of the liquid crystal display shown in FIG. 7 taken along the line XI-XI.

Referring to FIG. 7, FIG. 8, FIG. 9, FIG. 10, and FIG. 11, a liquid crystal display according to the present exemplary embodiment includes a lower panel (thin film transistor array panel) 100, an upper panel (common electrode panel) 200, and a liquid crystal layer 3.

First, the thin film transistor array panel 100 will be described.

A gate conductor including a plurality of gate lines 121 and a plurality of storage electrode lines 131 are formed on an insulation substrate 110.

The gate lines 121 extend mainly in a transverse direction, and each gate line 121 includes a plurality of first and second gate electrodes 124a and 124b that protrude upward, and a wide end portion 129.

The storage electrode lines 131 extend mainly in the transverse direction and are disposed between two gate lines 121.

Referring to FIG. 9, each storage electrode line 131 includes a storage electrode 137 with a shape of an open-quadrangle belt, and a connection 136 connected to the storage electrode 137. The storage electrode 137 includes transverse electrodes 133, 134a, and 134b, and longitudinal electrodes 135, and the transverse electrodes 133, 134a, and 134b have a greater width than that of the longitudinal electrode 135. The transverse electrodes 133, 134a, and 134b include an upper electrode 133, a right lower electrode 134a, and a left lower electrode 134b. One end of the upper electrode 133 and one end of the right lower electrode 134a are connected by one longitudinal electrode 135, and the other end of the upper electrode 133 and one end of the left lower electrode 134b are connected by the other longitude electrode 135. The other end of the right lower electrode 134a and the other end of the left lower electrode 134b is are separated from each other by a predetermined distance, thereby forming the open-quadrangle. The connection 136 is connected substantially to the center of the longitudinal electrode 135.

A gate insulating layer 140 is formed on the gate conductors 121 and 131.

A plurality of first and second semiconductor stripes 151a and 151b (in the drawing, only "151a" appears, and "151b" is not shown, but "151b" is used for convenience) are formed on the gate insulating layer 140. The first and second semiconductor stripes 151a and 151b extend in the longitudinal direction, and include first and second protrusions 154a and 154b extending toward the first and second gate electrodes 124a and 124b, respectively.

A plurality of first ohmic contact stripes 161a and first ohmic contact islands 165a are formed on the first semiconductor stripes 151a. The first ohmic contact stripes 161a include a plurality of first protrusions 163a, and the first protrusion 163a and the first ohmic contact island 165a are disposed as a pair on each first protrusion 154a.

A plurality of second ohmic contact stripes (not shown) and second ohmic contact islands (not shown) are formed on the second semiconductor stripes 151b (not shown). The second ohmic contact stripes also include a plurality of protrusions (not shown), and the protrusion and the second ohmic contact island are disposed as a pair on each second protrusion 154b.

A plurality of first data lines 171a are formed on the first ohmic contact stripes 161a, and a plurality of first drain electrodes 175a are formed on the first ohmic contact islands 165a. A plurality of second data lines 171b are formed on the second ohmic contact stripes, and a plurality of second drain electrodes 175b are formed on the second ohmic contact islands.

The first and second data lines 171a and 171b extend substantially in the longitudinal direction, thereby crossing the gate lines 121 and the connections 136 of the storage electrode lines 131. The first and second data lines 171a and 171b include a plurality of first and second source electrodes 173a and 173b extending toward the first and second gate electrodes 124a and 124b, and end portions 179a and 179b, respectively.

The first and second drain electrodes 175a and 175b start from one end enclosed by the curved portions of the first and second source electrodes 173a and 173b on the first and second gate electrodes 124a and 124b, respectively, and extend upward.

The ohmic contacts 161a and 165a only exist between the semiconductor stripes 151a thereunder, and the first data lines 171a and the first drain electrodes 175a thereabove, and reduce contact resistance between them. The second ohmic contacts only exist between the underlying second semiconductor stripes 151b and the overlying second data lines 171b and second drain electrodes 175b, thereby reducing contact resistance therebetween. The first semiconductor stripes 151a have substantially the same planar shape as the first data lines 171a, the first drain electrodes 175a, and the first ohmic contacts 161a and 165a. The second semiconductor stripes 151b have substantially the same planar shape as the second data lines 171b, the second drain electrodes 175b, and the second ohmic contacts. However, the semiconductor stripes 151a and 151b have portions that are exposed without being covered by the data lines 171a and 171b and the drain electrodes 175a and 175b, such as the portions between the source electrodes 173a and 173b and the drain electrodes 175a and 175b.

A passivation layer 180 is formed on the first and second data lines 171a and 171b, the first and second drain electrodes 175a and 175b, and the exposed semiconductor stripes 151a and 154b. The passivation layer 180 includes a lower layer 180p made of an inorganic insulator such as silicon nitride or silicon oxide, and an upper layer 180q. At least one of the lower layer 180p and the upper layer 180q may be omitted.

The passivation layer 180 has a plurality of contact holes 182a and 182b exposing the end portions 179a and 179b of the data lines 171a and 171b, respectively, and a plurality of contact holes 185a and 185b exposing the wide end portions of the drain electrodes 175a and 175b, respectively, and the passivation layer 180 and the gate insulating layer 140 have a plurality of contact holes 181 exposing the end portions 129 of the gate lines 121.

A plurality of color filters 230 are formed between the lower layer 180p and the upper layer 180q.

The color filters 230 have a plurality of through holes 235a and 235b through which the contact holes 185a and 185b pass, respectively, and the through holes 235a and 235b are larger than the contact holes 185a and 185b. The color filters 230 also include a plurality of openings 233a, 233b, 234a, and 234b disposed on the storage electrodes 137. The openings 233a and 233b are disposed on the upper electrode 133, and the openings 234a and 234b are respectively disposed on the right lower electrode 134a and the left lower electrode 134b.

A plurality of pixel electrodes 191 and a plurality of contact assistants 81, 82a, and 82b are formed on the upper layer 180q of the passivation layer 180.

As shown in FIG. 8, the pixel electrodes 191 according to the present exemplary embodiment have substantially the same shape as the pixel electrode 191 shown in FIG. 2. The pixel electrode 191 includes a first subpixel electrode 191a and a second subpixel electrode 191b that are opposite to each other via a gap 91, and notches 97 and 98 are formed on the edge and corners of the first subpixel electrode 191a and the second subpixel electrode 191b, respectively.

The gap 91 between the first subpixel electrode 191a and the second subpixel electrode 191b overlaps the storage electrode 137. The storage electrode 137 blocks light leakage between the first subpixel electrode 191a and the second subpixel electrode 191b, and is simultaneously blocks texture caused by the light alignment. The texture caused by the light alignment is generated in regions toward which the liquid crystal molecules 31 incline with respect to the gap. For example, in FIG. 10, the positions where textures are generated are the left-upper portion and the right-lower portion of the first subpixel electrode 191a, and the right-upper portion and the left-lower portion of the second subpixel electrode 191b. Accordingly, if the left-half portion of the first subpixel electrode 191a is moved up and the right-half portion thereof is moved down, the texture generation region of the first subpixel electrode 191a and the texture generation region of the second subpixel electrode 191b are disposed on the same straight line. Accordingly, the storage electrode 137 having a simple shape and a small area may effectively cover the texture generation regions.

The pixel electrodes 191 also overlap the storage electrodes 137 to form a storage capacitor. That is, the first subpixel electrode 191a overlaps the upper electrode 133 and the right lower electrode 134a thereby forming the storage capacitor Csta, and the second subpixel electrode 191b overlaps the upper electrode 133 and the left lower electrode 134b thereby forming the storage capacitor Cstb. Here, the pixel electrode 191 and the storage electrode 137 overlap only via the passivation layer 180 in the openings 233a and 234a of the color filters 230, so that the capacitance of the storage capacitor may be increased The first and second gate electrodes 124a and 124b, the first and second protrusions 154a and 154b of the first and second semiconductor stripes 151a and 151b, respectively, the first and second source electrodes 173a and 173b, and the first and second drain electrodes 175a and 175b form the first and second thin film transistors Qa and Qb, respectively. The first and second drain electrodes 175a and 175b are connected to the first and second subpixel electrodes 191a and 191b through the contact holes 185a and 185b, respectively.

The contact assistants 81, 82a, and 82b are connected to the end portions 129, 179a, and 179b of the gate lines 121 and the data lines 171a and 171b, respectively. The contact assistants 81, 82a, and 82b complement adhesion of the end portions 129 of the gate lines 121 and the end portions 179a and 179b of the data lines 171a and 171b with an external device such as a driver IC, and protect them.

Next, the common electrode panel 200 will be described.

A plurality of light blocking members 220 are formed on an insulating substrate 210, an overcoat 250 is formed on the light blocking members 220, and a common electrode 270 is formed on the overcoat 250. However, in FIG. 7, the light blocking member 220 is not shown for convenience of distinction between elements.

Alignment layers 11 and 21 are formed on the facing surfaces of the thin film transistor array panel 100 and the common electrode panel 200.

According to embodiments of the present invention, the pixel electrode may include notches such that liquid crystal molecules of each alignment region may be quickly stabilized.

Also, textures generated at a region where the alignment direction determined by the light alignment and the alignment direction of the liquid crystal molecules by the fringe field at a gap between two subpixels may be effectively covered such that transmittance may be improved and the textures may be prevented from appearing as a stain. Thereby, display characteristics may be improved. It will be apparent to those skilled in the art that various modifications and variation can be made in the present invention without departing from the spirit or scope of the invention. Thus, it is intended that the present invention cover the modifications and variations of this invention provided they come within the scope of the is appended claims and their equivalents.

What is claimed is:

1. A liquid crystal display, comprising:
    a first substrate;
    a first data line disposed on the first substrate and extending in a first direction;
    a second data line disposed on the first substrate, the second data line being disposed adjacent to the first data line and extending in the first direction;
    a pixel electrode disposed on the first substrate, the pixel electrode comprising a first sub-pixel electrode and a second sub-pixel electrode, the first sub-pixel electrode and the second sub-pixel electrode being paired with each other to form a pixel;
    a photo alignment layer disposed on the first substrate;
    a second substrate facing the first substrate; and
    a liquid crystal layer comprising liquid crystal molecules interposed between the first substrate and the second substrate,
    wherein the liquid crystal layer is disposed on each of the first sub-pixel electrode and the second sub-pixel electrode and comprises a plurality of sub-regions, each of the plurality of sub-regions being defined by an inclination direction of the liquid crystal molecules when an electric field is generated in the liquid crystal layer by applying voltages to the first sub-pixel electrode and the second sub-pixel electrode, the voltages applied to the first sub-pixel electrode and the second sub-pixel electrode being different from each other,
    wherein the first sub-pixel electrode is electrically connected to a first thin film transistor, and the second sub-pixel electrode is electrically connected to a second thin film transistor, and
    wherein the first sub-pixel electrode is disposed between the first data line and the second data line and overlaps a portion of the first data line and a portion of the second data line.

2. The liquid crystal display of claim 1, further comprising a first notch arranged in the first sub-pixel electrode, the second sub-pixel electrode, or both the first sub-pixel electrode and the second sub-pixel electrode.

3. The liquid crystal display of claim 2, wherein the first notch comprises at least one edge.

4. The liquid crystal display of claim 3, wherein a direction in which the at least one edge extends is different from the inclination direction of the liquid crystal molecules.

5. The liquid crystal display of claim 3, wherein a length of the at least one edge of the first notch is in a range of about 3 μm to about 15 μm.

6. The liquid crystal display of claim 2, wherein the first notch comprises two edges meeting at a point.

7. The liquid crystal display of claim 2, further comprising a second notch arranged in the first sub-pixel electrode, the second sub-pixel electrode, or both the first sub-pixel electrode and the second sub-pixel electrode.

8. The liquid crystal display of claim 7, wherein the first notch and the second notch are aligned in a line, the line being parallel to the first direction.

9. The liquid crystal display of claim 8, wherein the first notch and the second notch each comprise at least one edge.

10. The liquid crystal display of claim 9, wherein a direction in which the at least one edge extends is different from the inclination direction of the liquid crystal molecules.

11. The liquid crystal display of claim 10, wherein a length of the at least one edge of the first notch is in a range of about 3 μm to about 15 μm.

12. The liquid crystal display of claim 10, wherein the first notch and the second notch each comprise two edges meeting at a point.

13. The liquid crystal display of claim 2, wherein the first notch comprises a shape selected from a triangle, a quadrilateral, a trapezoid, and a semicircle.

14. The liquid crystal display of claim 2, further comprising a second notch arranged at a boundary line of two adjacent sub-regions.

15. The liquid crystal display of claim 14, wherein the second notch comprises a shape selected from a triangle, a quadrilateral, a trapezoid, and a semicircle.

16. The liquid crystal display of claim 1, wherein the first sub-pixel electrode is connected to the first thin film transistor through a contact hole that is disposed on a boundary line of two adjacent sub-regions.

17. The liquid crystal display of claim 1, further comprising a storage electrode overlapping the first sub-pixel electrode, the second sub-pixel electrode, or both the first sub-pixel electrode and the second sub-pixel electrode.

18. The liquid crystal display of claim 17, wherein the storage electrode overlaps a texture generation region of the first sub-pixel electrode, the second sub-pixel electrode, or both the first sub-pixel electrode and the second sub-pixel electrode.

19. The liquid crystal display of claim 1, wherein the first sub-pixel electrode, the second sub-pixel electrode, or both the first sub-pixel electrode and the second sub-pixel electrode comprise a stepped portion.

20. The liquid crystal display of claim 19, wherein the stepped portion is disposed at a region corresponding to the first thin film transistor, the second thin film transistor, or both the first thin film transistor and the second thin film transistor.

21. The liquid crystal display of claim 1, wherein a size of the first sub-pixel electrode is different from a size of the second sub-pixel electrode.

22. The liquid crystal display of claim 7, wherein the first notch and the second notch both overlap the first data line.

23. The liquid crystal display of claim 7, wherein the first notch and the second notch are formed in the same edge of the first sub-pixel electrode as each other.

24. The liquid crystal display of claim 19, wherein the first sub-pixel electrode comprises a first stepped portion and a second stepped portion, the first stepped portion is disposed at a region corresponding to the first thin film transistor, and the second stepped portion is disposed at a region corresponding to the second thin film transistor.

* * * * *